US006516506B2

(12) United States Patent
Donnelly et al.

(10) Patent No.: US 6,516,506 B2
(45) Date of Patent: Feb. 11, 2003

(54) INSTALLING A SCROLLED RESILIENT SHEET ALONGSIDE THE INNER SURFACE OF A FLUID CONDUIT

(75) Inventors: Martin Donnelly, Amsterdam (NL); Wilhelmus Christianus Maria Lohbeck, Rijswijk (NL); Robert Bruce Stewart, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/779,775

(22) Filed: Feb. 9, 2001

(65) Prior Publication Data

US 2001/0039711 A1 Nov. 15, 2001

Related U.S. Application Data

(63) Continuation of application No. 09/140,938, filed on Aug. 27, 1998, now abandoned.

(30) Foreign Application Priority Data

Aug. 27, 1997 (EP) ........................................... 97306555

(51) Int. Cl.[7] .......................... B23P 11/02; E21B 29/00; F16L 55/18

(52) U.S. Cl. ........................ 29/451; 29/402.09; 138/97; 166/207; 166/277; 264/269

(58) Field of Search ............................. 29/402.09, 450, 29/451, 458; 138/97, 98; 166/207, 277; 264/269, 516

(56) References Cited

U.S. PATENT DOCUMENTS

| | | | |
|---|---|---|---|
| 341,327 A | 5/1886 | Fay | 138/154 |
| 3,789,888 A | 2/1974 | Breitfuss | 138/146 |
| 4,109,684 A | 8/1978 | Fernandez | 29/451 |
| 4,313,696 A | 2/1982 | Horten | 29/451 |
| 4,347,018 A | 8/1982 | Wrightson et al. | 29/451 |
| 4,501,327 A | 2/1985 | Retz | 166/285 |
| 5,040,283 A | 8/1991 | Pelgrom | 29/447 |
| 5,042,532 A | 8/1991 | Gilleland | 138/98 |
| 5,119,862 A | 6/1992 | Maimets et al. | 138/98 |
| 5,725,026 A | 3/1998 | Maimets | 138/98 |

FOREIGN PATENT DOCUMENTS

| | | | |
|---|---|---|---|
| JP | 2-164952 | 6/1990 | 138/98 |
| SU | 1810482 | 4/1993 | 166/277 |

*Primary Examiner*—David P. Bryant

(57) ABSTRACT

A scrolled resilient sheet is installed against the inner surface of a fluid conduit using a carrier tool from which a resilient sheet having an average thickness more than 2 mm and an elastic or pseudoelastic recoverable strain of at least 0.6% is released so that the sheet expands with an expansion force which is sufficiently high to allow the sheet to press itself into place alongside the inner surface of the conduit and to remain in place after installation.

9 Claims, 1 Drawing Sheet

6 5 1 2 4 3 7 7

INSTALLING A SCROLLED RESILIENT SHEET ALONGSIDE THE INNER SURFACE OF A FLUID CONDUIT

This is a continuation of application Ser. No. 09/140,938 filed Aug. 27, 1998, now abandoned the entire disclosure of which is hereby incorporated by reference.

BACKGROUND OF THE INVENTION

The invention relates to a method for installing a scrolled resilient sheet alongside the inner surface of a fluid conduit.

It is known from U.S. Pat. Nos. 4,501,327 and 5,040,283 to scroll a sheet around a carrier tool and then move the carrier tool carrying the scrolled sheet through the conduit towards a location where the resilient sheet is to be installed, whereupon the sheet is released from the carrier tool and allowed to expand towards the inner surface of the conduit.

U.S. Pat. No. 5,040,283 employs a sheet made of a memory metal which expands as a result of a temperature increase. A drawback of this method is that memory metals are expensive and are not readily available in large sheets.

U.S. Pat. No. 4,501,327 discloses the use of spring steel or aluminum as a resilient material, which materials have an elastic strain which is 0.55% or less (0.2% for aluminum) and that a suitable thickness for the sheet material is approximately 3/64 inch (=1.2 mm).

In this known method the resilient material is pressed against the wall of the conduit when the carrier tool is pulled back through the expanded sheet.

Drawbacks of this known method are that a relatively thin sheet material is used which can be easily damaged and which has a resiliency which is only sufficient to unscroll the sheet but which does not induce the sheet to press itself into place alongside the inner wall of the conduit so that a final pressing step is still required.

It is believed that the low wall thickness of the known aluminum or spring steel sheets and the relatively low expansion force are associated with the low elastic strain capacity of the materials used.

It is an object of the present invention to eliminate these drawbacks and to provide a method for installing a scrolled resilient sheet alongside the inner surface of a fluid conduit which allows the use of a relatively thick and robust sheet which is not easily damaged after installation and which does not require the-step of pressing the sheet alongside the wall of the conduit by means of an expansion tool.

SUMMARY OF THE INVENTION

Toward providing these and other advantages the method according to the present invention employs a resilient sheet which has an average wall thickness of at least 2 mm and an elastic or pseudoelastic recoverable strain of at least 0.6% so as to induce the scrolled sheet to expand with an expansion force which is sufficiently high to allow the sheet to press itself into place alongside the inner surface of the conduit during installation and to remain in place after installation.

When used in this specification the term elastic strain refers to the yield stress-Young's modulus ratio for materials which have a yield point, like many carbon steels have, or the proof stress-Young's modulus ratio for materials which do not have a yield point. If the elastic strain is expressed as a percentage then said ratio's are to be multiplied by a factor of 100.

Preferably the resilient sheet has an average wall thickness of at least 3 mm and is made of a titanium alloy having an elastic modulus not more than 115.000 MPa and a proof stress of at least 825 MPa, so that the elastic strain is more than 0.75%.

It is also preferred that the resilient sheet material has an average wall thickness of at least 4 mm and is made of a Ti-6Al-4V alloy.

The sheet may be a rectangular sheet without perforations which is used to provide a seal or a patch of an area where the wall of the conduit has been ruptured, damaged or eroded. Alternatively the fluid conduit is formed by an inflow region of a hydrocarbon production well and the sheet is perforated at regular intervals and is installed alongside the inner surface of the wellbore to serve as a wellscreen.

If the sheet is to be scrolled to a very small diameter, for example if it is to be moved through constrictions in the conduit, then it can be beneficial to use a pseudoelastic alloy as sheet material. Suitable pseudoelastic alloys are Ti-16V-3Al-6Zr and TiNi.

BRIEF DESCRIPTION OF THE DRAWINGS

These and further features, objects and advantages of the method according to the invention will be more fully appreciated by reference to the following detailed description of a preferred embodiment of the invention which should be read in conjunction with the accompanying drawings in which.

DETAILED DESCRIPTION OF THE PREFERRED EMBODIMENT

Figure 1:
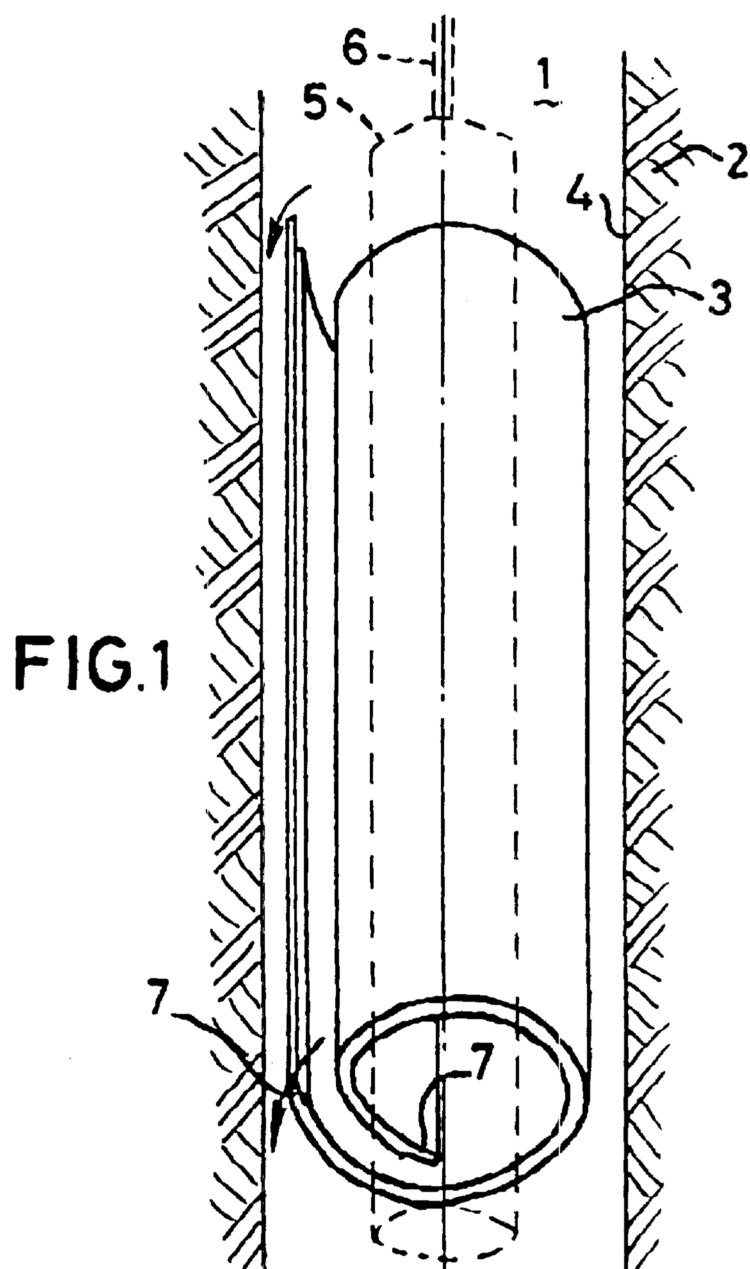
FIG. 1 is a schematic side elevational view of a resilient sheet which is being placed inside a conduit in the form of a vertical underground borehole.

Referring now to FIG. 1 there is shown a vertical wellbore 1 traversing an underground formation 2 and a resilient sheet 3 which is unscrolling itself against the wall 4 of the wellbore 1.

The sheet 3 has been lowered into the wellbore 1 using a carrier tool 5 which is suspended on a wireline 6.

The carrier tool 5 and wireline 6 are shown in the drawing in dotted lines.

Before lowering the carrier tool 5 into the wellbore 1 the sheet 3 is scrolled around the tool 5 and fixed to the tool 5 using tack welds and/or clips. When the tool has arrived at the location where the sheet 3 is to be installed the tack welds and/or clips are released, for example using explosive devices which shear off the tack welds and/or clips.

The resilient sheet 3 has a thickness of at least 2 mm and an elastic strain of at least 0.6% which allows the sheet to develop a high expansion force so that it expands and presses itself into place against the wall 4 of the wellbore 1 and to remain in place after installation even if the pore pressure of the surrounding formation 2 is higher than the fluid pressure within the wellbore 1.

When seen in circumferential direction, the ends of the resilient sheet 3 form flaps 7 where the sheet 3 has a reduced wall thickness. The circumferential length of the sheet 3 will be chosen slightly larger than the circumference of the wall 4 of the wellbore 1 such that the flaps 7 will at least partly overlap if the resilient sheet 3 has been expanded against said wall 4. Thus the flaps 7 will create a shut-off for leaks and will create a smooth and almost seamless internal bore of the expanded sheet 3. To improve the sealing a further sleeve (not shown) of cellular rubber may be placed outside the outer flap 7. This sleeve should be bonded along an axial line, but not around the circumference of the flap 7. This is because the rubber has to stretch on unscrolling, and must therefore slide over the flap 7 which does not stretch. The interface may be lubricated.

In the assembly shown in FIG. 1 the flaps 7 are not taken into account for determination of the average wall thickness of the sheet 3. In accordance with the invention the average wall thickness of the sheet 3 is at least 2 mm whereas the wall thickness of the flaps 7 may be less than 2 mm. Thus, when used in this specification, the term average wall thickness of the sheet denotes the wall thickness of any parts of the sheet 3 other than the flaps 7 and locations where the sheet 3 is perforated.

The maximum average wall thickness T of a sheet 3 that will fully elastically unscroll can be estimated on the basis of the formula:

$$T/d-T/D<Y/E$$

where: d=the scrolled diameter of the sheet

D=the relaxed diameter of the sheet

Y=the yield or proof stress of the sheet material; and

E=the elastic modulus of the sheet material. By virtue of its high elastic strain, viz. at least 0.6% resulting from the combination of low elastic or Young's modulus (preferably not more than 115.000 MPa) and high proof stress (preferably at least 825 MPa) the sheet according to the invention can have larger wall thickness than conventional resilient sheets. Titanium alloys having an elastic modulus less than 150.000 MPa are particularly suitable for use in the sheet according to the invention. A Ti alloy grade 5 sheet having an average wall thickness of 4 mm can be used for a 7" (17.5 mm) casing repair. A Ti-22V-4Al alloy sheet having an elastic modulus of 82 MPa and thermomechanically processed to achieve a proof stress of 720 MPa or greater can be used for the same repair with an average wall thickness of 5 mm.

Further, some metastable beta-titanium alloys such as Ti-16V-3Al-6Zr with appropriate thermomechanical processing exhibit pseudoelasticity to an extent that would permit an average wall thickness between 11 and 13 mm. TiNi would permit even greater wall thickness. These pseudoelastic alloys can also be used to permit scrolling to a smaller diameter when the sheet has an average wall thickness of several millimeters to allow installation through constrictions, such as through-tubing operations in an oil or gas production well.

The large average wall thickness of the sheet 3 is not only useful for creating a robust scroll but also for enhancing the spring force with which the sheet 3 unscrolls and presses itself against the wall 4 of the wellbore 1.

Figure 2:
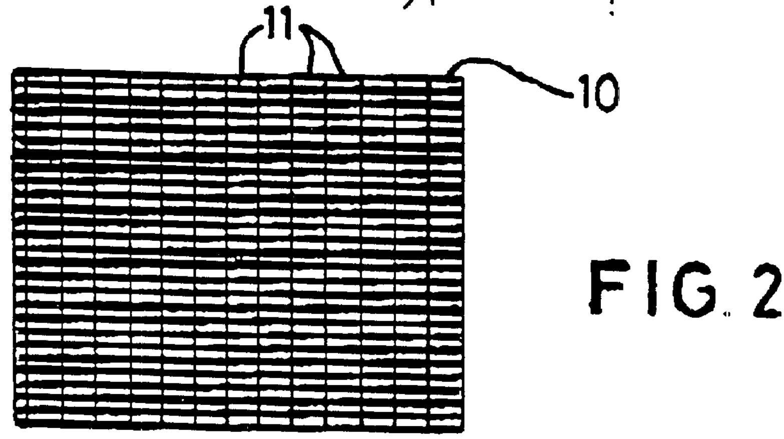
FIG. 2 is a side view of an unscrolled resilient sheet which comprises circumferential slots so that the sheet can be used as a wellscreen.

Referring now to FIG. 2 there is shown a view of an unscrolled sheet according to the invention where the sheet forms a well screen 10 which contains elongate circumferential slots 11 that are arranged in substantially parallel rows both axially and circumferentially across the screen 10, with no stagger between the rows of slots. The perforations are also tapered (not shown) in radial direction so that the smallest width of the perforations is located at the outer surface of the sheet when the sheet is scrolled.

The tapered shape of the slots 11 serves to avoid that sand particles which may enter the slots 11 could become stuck partway in the slots 11.

Circumferential unstaggered slots 11 are preferred to holes or non-circumferential slots because the operation of scrolling and unscrolling can be performed with minimal stress concentrations in the screen material, while retaining maximum spring force, strength and stiffness.

The scrolled wellscreen shown in FIG. 2 can also be covered, preferably at the outer surface, with filter material. Optionally the filter material can be separated from the surface of the screen 10 by a drainage layer, for example coarse woven wire, so that the fluid passing through the filter layer not immediate opposite a slot 11 in the scroll can flow to the slot 11 through the drainage layer.

The filter and drainage layers can be made of scrolled sheets of filter and drainage material which surround the screen 10. The sheets of the screen 10 and of the filter and drainage layers can be provided with end flaps where the sheet has reduced thickness in the same way as shown in FIG. 1 in order to create a seamless screen when the assembly of the screen 10 and surrounding filter and drainage layers unscrolls itself against the wellbore or perforated production liner. The wellscreen can thus press itself directly against the wellbore or perforated production liner, without an intervening annulus, thus obviating the need for gravel packing, thereby reducing the risk of erosion and stabilizing the formation.

If desired, the overlapping ends of the sheet or screen may be maintained in a fixed position relative to each other once the sheet has been expanded and installed within the conduit or wellbore. This may be achieved by welding or bonding the ends to each other, or by providing the overlapping ends with axial locking grooves or with ratchet profiles that allow unscrolling but prevent re-scrolling of the sheet or screen.

We claim:

1. A method for installing a scrolled resilient sheet alongside the inner surface of a fluid conduit, the method comprising the steps of:

scrolling the resilient sheet and securing the scrolled sheet to a carrier tool such that the carrier tool carrying the scrolled sheet can be moved through the conduit;

moving the carrier tool to a location in the conduit where the resilient sheet is to be installed; and releasing the resilient sheet from the carrier tool thereby allowing the resilient sheet to expand towards the inner surface of the conduit, wherein the resilient sheet has an average wall thickness of at least 2 mm and an elastic strain or a pseudoelastic recoverable strain of at least 0.6% so as to induce the scrolled sheet to expand with an expansion force which is sufficiently high to allow the sheet to press itself into place alongside the inner surface of the conduit during installation and to remain in place after installation with no further means of securing the sheet in place.

2. The method of claim 1, wherein the resilient sheet has an average wall thickness of at least 3 mm and is made of a titanium alloy having an elastic modulus not more than 115.000 MPa and a proof stress of at least 825 MPa.

3. The method of claim 2, wherein the resilient sheet material has an average wall thickness of at least 4 mm and is made of a Ti-6Al-4V alloy.

4. The method of claim 1, wherein the fluid conduit is formed by an inflow region of hydrocarbon production well and the sheet is perforated at regular intervals and is installed alongside the inner surface of the wellbore to serve as a wellscreen.

5. The method of claim 4, wherein the perforations consist of elongate circumferential slots which are arranged in substantially parallel rows both axially and circumferentially across the sheet, with no stagger between the rows of slots.

6. The method of claim 4, wherein the perforations are tapered in radial direction such that the smallest width of the perforations is located at the outer surface of the scrolled resilient sheet.

7. The method of claim 1, wherein the resilient sheet has a thickness of at least 5 mm and is made of a pseudoelastic alloy.

8. The method of claim 7, wherein the alloy is solution-treated Ti-16V-3Al-6Zr.

9. The method of claim 7, wherein the alloy is TiNi.

* * * * *